June 26, 1962 E. M. CAFERRO ET AL 3,041,596
DISPLAY SIGNS
Filed Dec. 10, 1956 12 Sheets-Sheet 1

INVENTORS
Edward M. Caferro
William H. Justus
BY
Stickwells
Atty.

June 26, 1962 E. M. CAFERRO ET AL 3,041,596
DISPLAY SIGNS
Filed Dec. 10, 1956 12 Sheets-Sheet 2

INVENTORS
Edward M. Caferro
William H. Justus
BY
Atty.

June 26, 1962   E. M. CAFERRO ET AL   3,041,596
DISPLAY SIGNS
Filed Dec. 10, 1956   12 Sheets-Sheet 3

INVENTORS
Edward M. Caferro
William H. Jutus
BY
Atty.

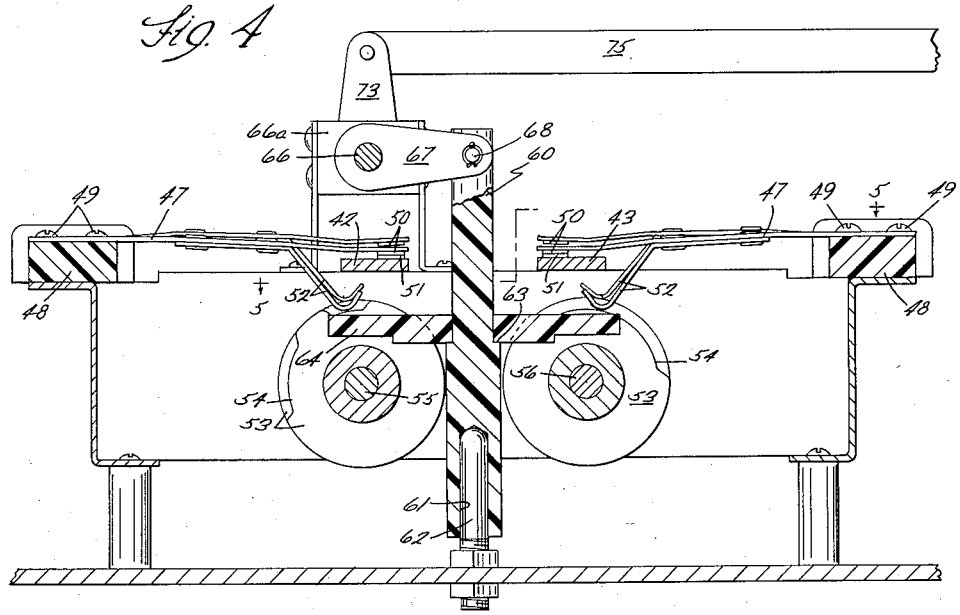
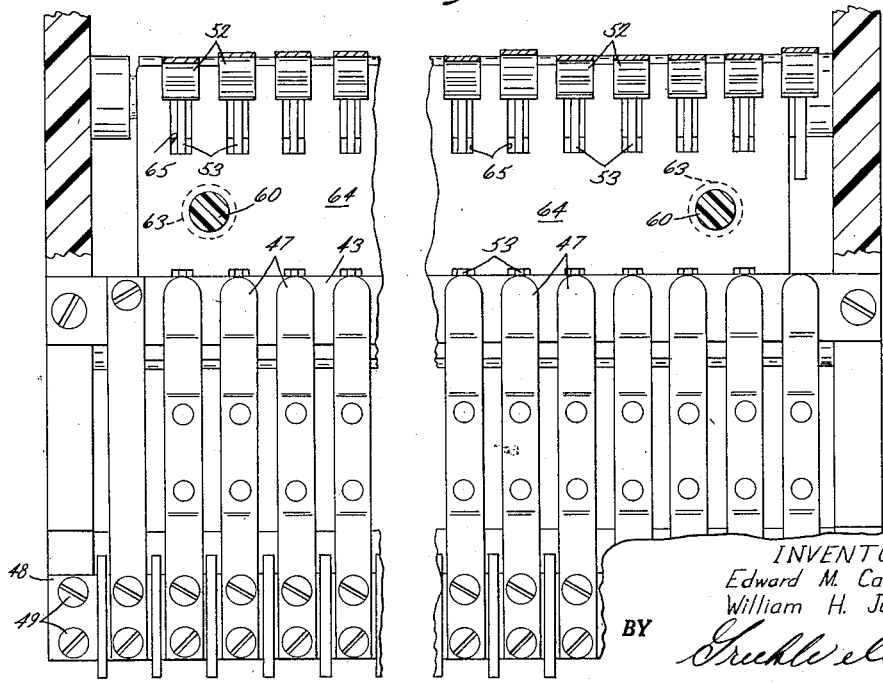

June 26, 1962 E. M. CAFERRO ET AL 3,041,596
DISPLAY SIGNS
Filed Dec. 10, 1956 12 Sheets-Sheet 5
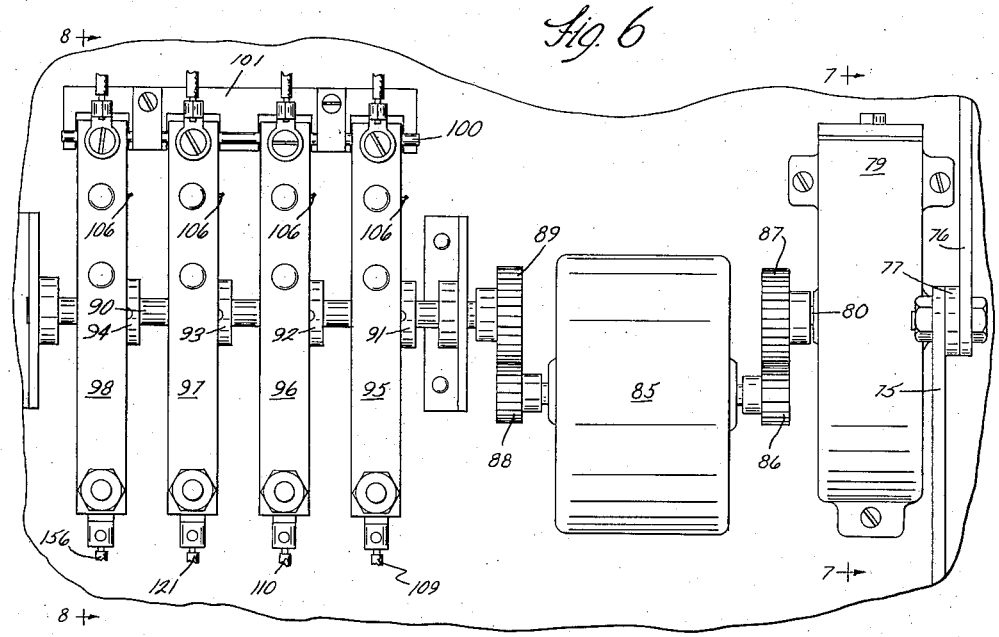
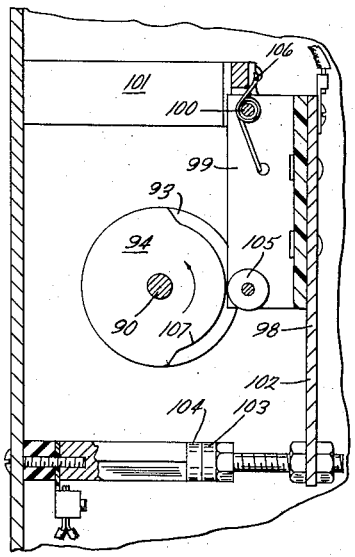
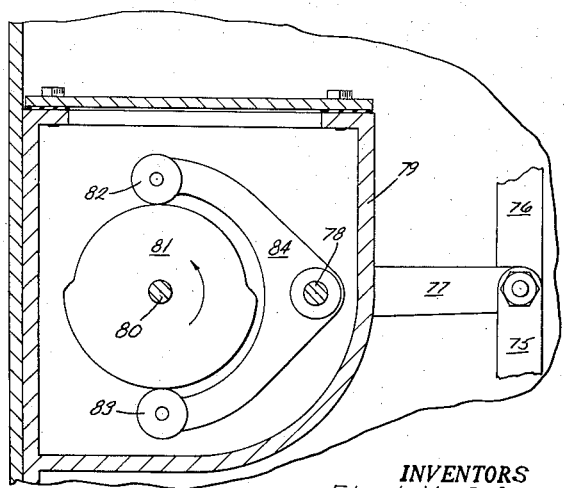
INVENTORS
Edward M. Caferro
William H. Justus
BY
Atty.

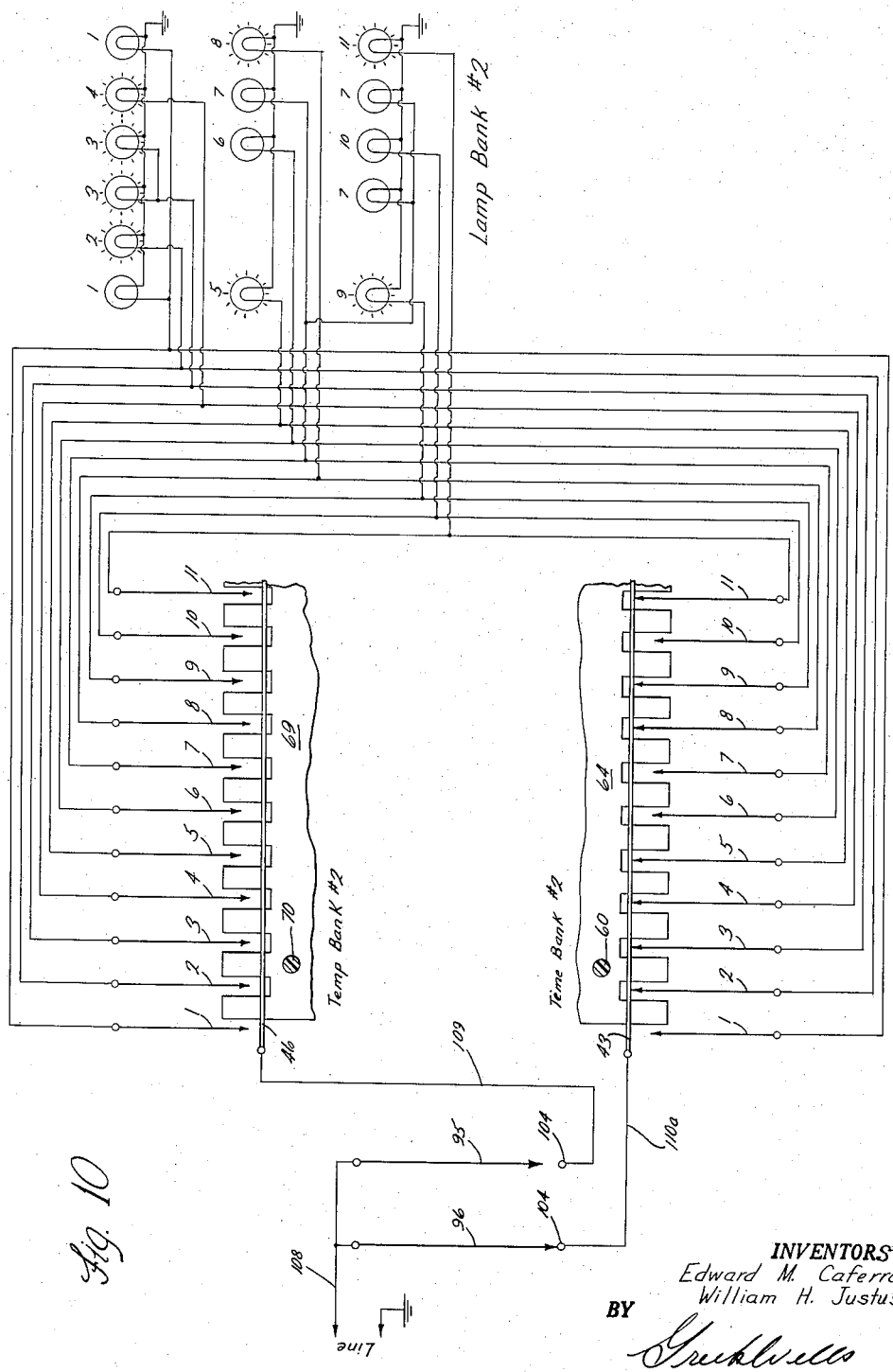

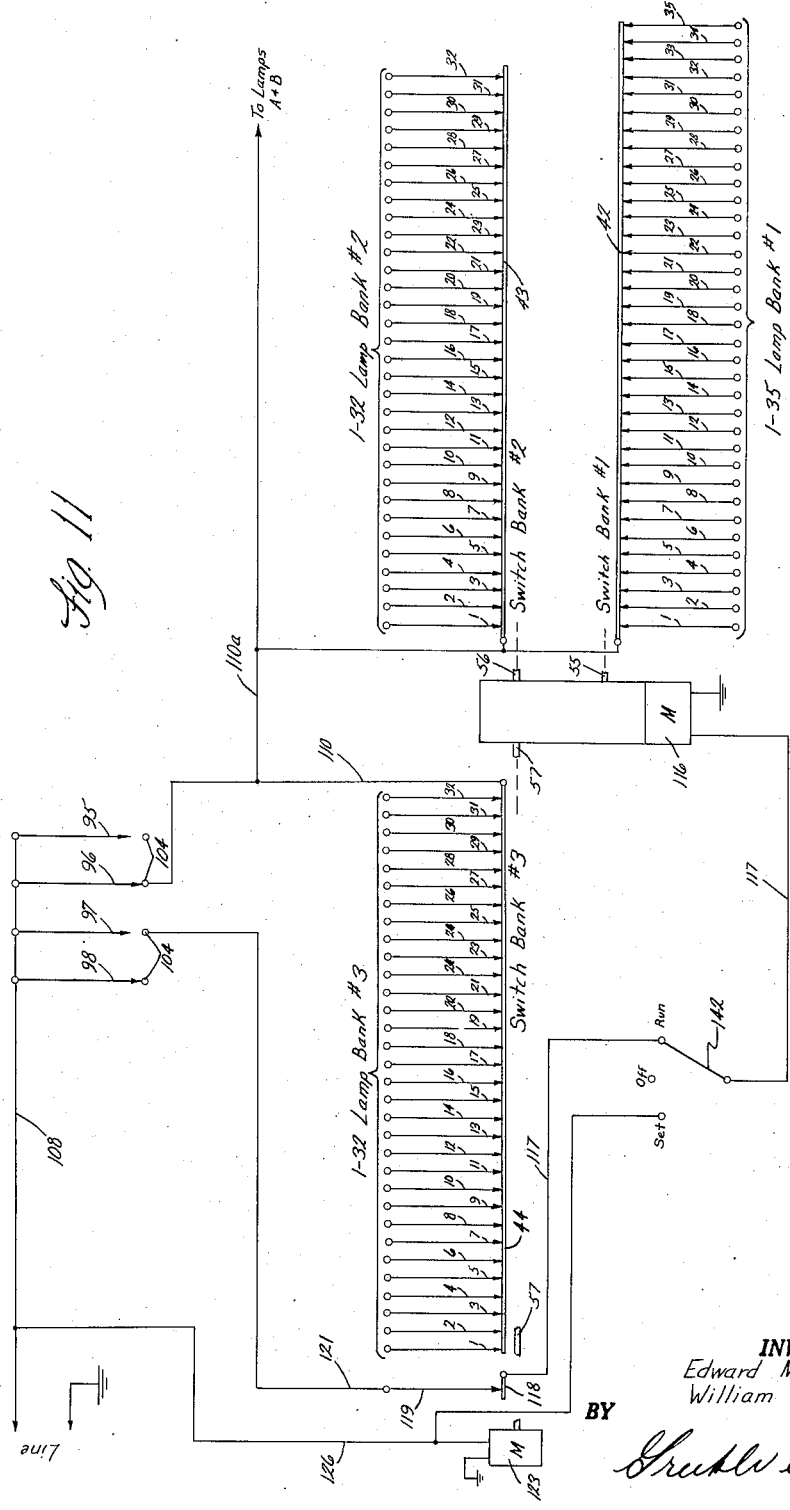

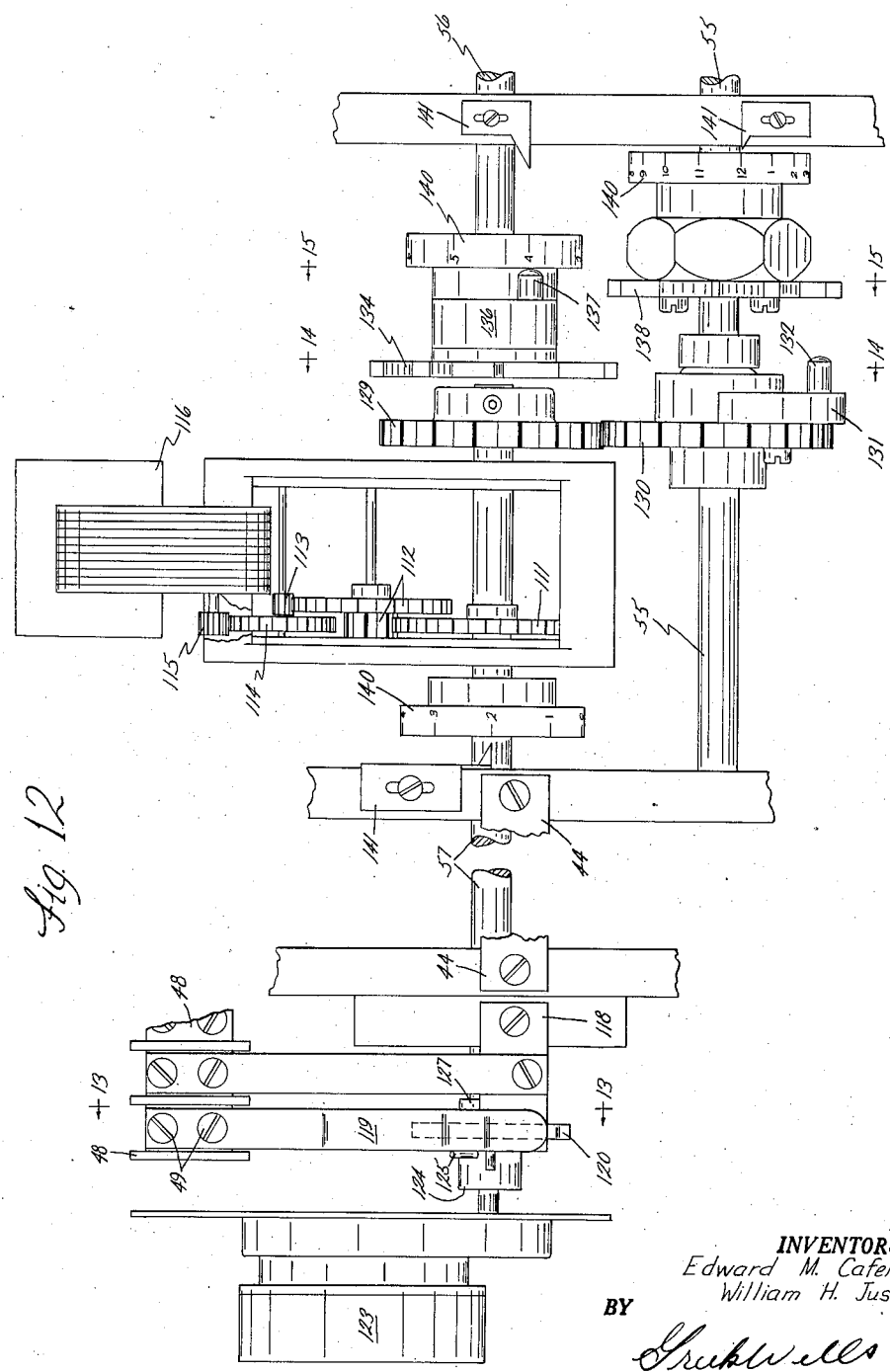

June 26, 1962  E. M. CAFERRO ET AL  3,041,596
DISPLAY SIGNS

Filed Dec. 10, 1956  12 Sheets-Sheet 9

INVENTORS
Edward M. Caferro
William H. Justus
BY
*Grudwells*
Atty.

June 26, 1962     E. M. CAFERRO ET AL     3,041,596
DISPLAY SIGNS
Filed Dec. 10, 1956     12 Sheets—Sheet 10

INVENTORS
Edward M. Caferro
William H. Justus
BY
Fruh Wells
Atty.

United States Patent Office 3,041,596
Patented June 26, 1962

3,041,596
DISPLAY SIGNS
Edward M. Caferro and William H. Justus, Spokane, Wash., assignors to American Sign & Indicator Corporation, Spokane, Wash.
Filed Dec. 10, 1956, Ser. No. 627,261
1 Claim. (Cl. 340—338)

The present invention relates to improvements in display signs, and more particularly to improvements in display signs wherein combinations of lighted and darkened lamps on a display panel are utilized to spell out the correct time and correct temperature in alternate displays.

The principal purpose of the invention is to provide a device of this character having one or more display panels upon which the alternate displays may be made, the displays consisting of combinations of lighted and darkened lamps spelling out correct time and temperature, time displays and temperature displays being controlled by separate mechanisms, each of which includes a plurality of contacts which may be opened and closed to light appropriate lamps on the panel, and continuously operating means to open and close the contacts to produce the desired combinations of lamps to display the correct information, and means to shift control of lamps on the display panel between the contacts of the time indicating mechanism and the contacts of the temperature mechanism to provide for alternate displays of the panel.

A further purpose of the invention is to provide means to disengage the contact opening and closing means of each of the time indicating mechanism and the temperature indicating mechanism during the period when the contacts of that mechanism are in control of the display panel.

A still further purpose of the invention is to provide in the contact control means of each of the time and temperature indicating mechanism novel driving means for the contact opening and closing devices which will operate those devices to set up the proper contact combinations in sequence but which will permit the opening and closing means for the contacts of each number in the display to be manually operated individually independently of the other contacts, whereby to permit rapid resetting of the contacts.

Another purpose of the invention is to provide in the contact control means of the temperature indicating mechanism novel means to insure that a predetermined amount of temperature change will result in operation of the contact control means at least and no more than that amount necessary to change the display one degree of temperature.

Still another purpose of the invention is to provide in the contact control means of the temperature indicating mechanism novel means to reverse the direction of operation of the contact control means when the temperature to be displayed falls below zero degrees F. whereby to permit the contact control means to set up contact combinations in positive sequence for temperature decline.

The nature and advantages of the invention will be explained more fully hereinafter in connection with the accompanying drawings illustrating a preferred form of the invention. It should be understood, however, that the drawings and description are illustrative only and are not intended to limit the invention except insofar as it is limited by the claim.

In the drawings:

FIGURE 4 is an enlarged fragmentary sectional view taken on the line 4—4 of FIGURE 3;

FIGURE 5 is a fragmentary sectional view taken substantially on the line 5—5 of FIGURE 4;

FIGURE 6 is an enlarged plan view of the motor and cam which drives the switch lifting means;

FIGURE 7 is a fragmentary sectional view taken substantially on the line 7—7 of FIGURE 6;

FIGURE 8 is a fragmentary sectional view taken substantially on the line 8—8 of FIGURE 6;

FIGURE 10 is a diagrammatic view illustrating the operation of the various switches which control a representative block of lamps on the display panel;

FIGURE 11 is a diagrammatic illustration of the circuit of the time indicating mechanism;

FIGURE 12 is a plan view of the motors and shafts which maintain correct time switch combinations on the switch banks of the time indicating mechanism;

Figure 2:
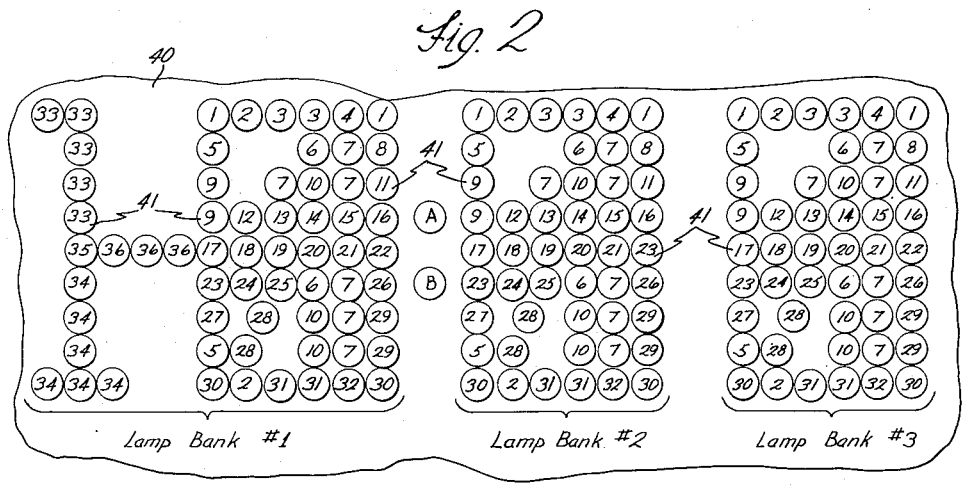
FIGURE 2 is a fragmentary diagrammatic view illustrating the arrangement of lamps on the display panel.

The function of the present invention is to display alternately the correct time and the present temperature upon a common display panel. Such a panel is illustrated at 40 in FIGURE 2 of the drawings. This panel includes a plurality of lamps 41 arranged so that certain of their number can be lighted to spell out in numbers the correct time and present temperature. To this end, the lamps 41 are arranged in three groups or banks, indicated as lamp banks 1, 2 and 3 in FIGURE 2. Lamp bank 1, at the left of the display panel 40 is adapted to display numbers from 1 to 12 to indicate the hours of the day, and to display numbers from —9 to 12 to indicate ten degree units of temperature from —90 to 120 degrees F. Lamp bank 2 is adapted to display numbers from 0 to 5 to indicate ten minute intervals of time and to display numbers from 0 to 9 to indicate one degree units of temperature. Lamp bank 3 is adapted to display numbers from 0 to 9 to indicate minutes of time. This bank is not utilized for temperature display.

Each of the banks 2 and 3 comprises a plurality of lamps arranged in a rectangular bank. In the particular configuration shown in FIGURE 2, the lamps are arranged in nine horizontal rows of lamps, each row, with the exception of a few, containing six lamps. Certain of the rows contain less than six lamps since certain portions of the rectangular bank are not needed in displaying numbers from 0 to 9. It has been found that certain of the lamps are always used together in displaying a number, so these lamps are connected together in parallel, and operated from a single power lead. With the six by nine lamp bank shown, the banks 2 and 3 each need 32 power leads to provide for displaying any number from 0 to 9. The lamps lighted by each of these leads are numbered in FIGURE 2 from 1 to 32, the lamps bearing the same number being connected in parallel to the same lead. For example, each lamp labeled number 7 is connected to lead 7. All of the lamps in the display panel are connected to a common ground.

Lamp bank 1, in addition to having a six by nine block of lamps identical to banks 2 and 3, has additional lamps arranged in the form of a numeral one, with a horizontal row of lamps extending from it to the rectangular block. This is necessary to display on bank 1 such numbers as 11 and 12, and a minus sign. As in the other two banks, 32 power leads are necessary to operate the rectangular block of bank 1, and the lamps are numbered accordingly. To operate the additional lamps in bank 1, four additional circuits are needed. The lamps in these circuits are numbered 33–36 accordingly. When numbers above nine are displayed on bank 1, lamps 33, 34 and 35 are lighted to display a one. When temperatures below zero degrees are displayed, lamps 35 and 36 are lighted to display a minus sign. It will be noted that lamps 33 and 34 always operate together and could be operated from a single source. This is not done because of the high current requirements which would be present.

It should be understood that while the lamps in the three banks bear corresponding numbers, each bank is operated separately, and no lamps from one bank are connected to lamps of another bank.

In addition to the lamps just described, the display panel 40 is provided with two lamps marked A and B. These lamps are connected in parallel and lighted with the time display to form a colon between the hour and minutes displayed. Lamps A and B remain darkened during the temperature display.

In order to alternately display time and temperature on the panel 40, a time indicating mechanism, a temperature indicating mechanism, and means to alternately energize these mechanisms to control the lamps 41 of the panel 40, are provided.

It is believed that the invention will be most readily understood if the time indicating mechanism and temperature indicating mechanism are considered in detail separately. Their constructions and operations will be described in detail later herein. Suffice it to say for the present, that each of these mechanisms includes a plurality of switch banks containing a number of cam operated switches which contact and receive current from a common bus bar. These switches may be manipulated to display the desired information on the display panel. The time indicating mechanism, illustrated in FIGURES 1 and 11, has three such switch banks, indicated in the drawings as time switch banks 1, 2 and 3. Time switch bank 1 has 35 switches therein, numbered consecutively from 1 to 35 which are connected to the lamp circuit leads 1–35 of lamp bank 1. These switches receive current from a bus bar 42 as shown in FIGURE 11. Time switch banks 2 and 3 each have 32 switches therein numbered consecutively from 1 to 32 which are connected to the corresponding leads 1–32 of lamp banks 2 and 3. A bus bar 43 provides current for the switches of bank 2 and a bus bar 44 provides current for the switches of bank 3.

Figure 1:
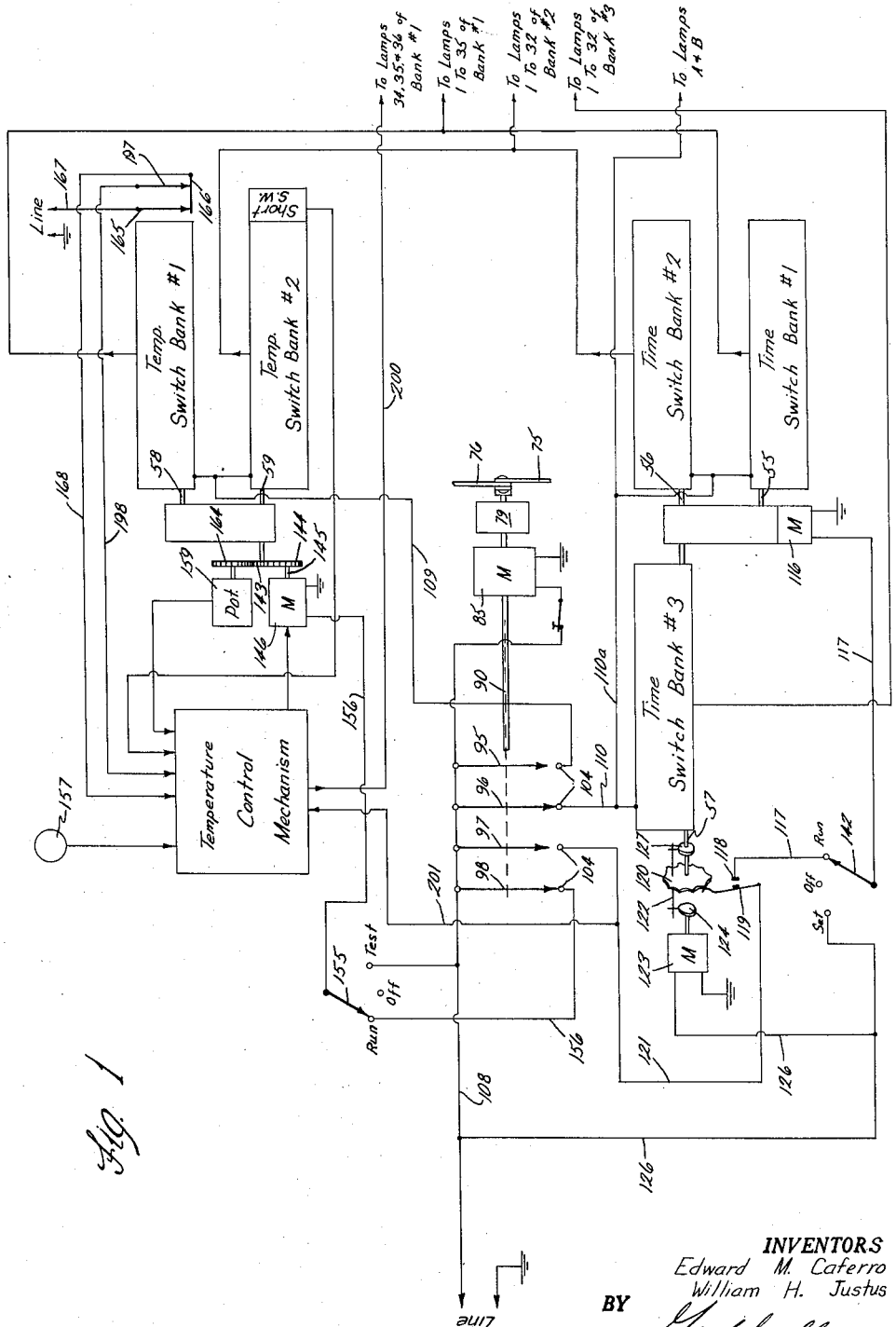
FIGURE 1 is a diagrammatic view of the complete mechanism which provides for displaying alternate time and temperature displays on a display panel.
Figure 16:
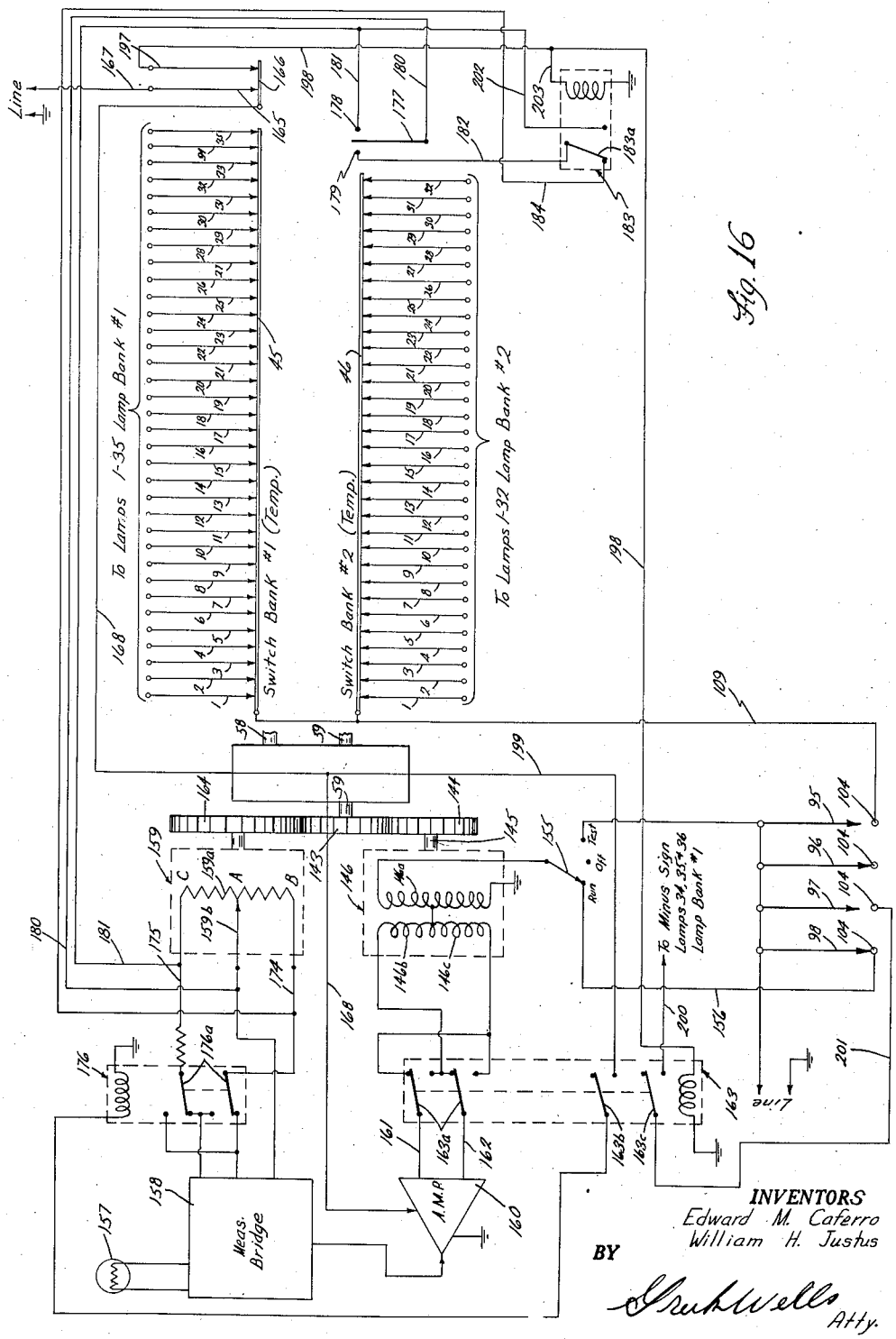
FIGURE 16 is a diagrammatic illustration of the circuit of the temperature indicating mechanism.

The temperature indicating mechanism, best illustrated in FIGURES 1 and 16, includes two switch banks indicated as temperature switch banks 1 and 2. These banks are identical to the banks 1 and 2 of the time indicating mechanism, bank 1 having 35 switches connected in parallel with the corresponding switches of time switch bank 1, to leads 1–35 of lamp bank 1, and temperature switch bank 2 having 32 switches connected in parallel with the corresponding switches of time switch bank 2 to the leads of lamp bank 2. The switches of temperature switch bank 1 receive current from a bus bar 45 and the switches of temperature switch bank 2 receive current from a bus bar 46.

FIGURES 1, 11 and 16 show the time and temperature switch banks diagrammatically and do not show the cams which operate the several switches of each bank. FIGURES 3, 4, 5 and 6 illustrate the physical characteristics of the switches, the particular construction being best shown in FIGURES 4 and 5. While these figures illustrate switches in the time indicating mechanism, it should be understood that all of the switches in the time and temperature indicating mechanisms are identical except for the shape of the actuating cam. Each switch comprises a spring metal strap 47 anchored at one end to a phenolic base block 48, by screws 49. The strap 47 has a contact point 50 at the free end thereof which is adapted to engage a second contact 51 on the bus bar 42, 43, 44, 45 or 46 which serves the particular switch. The strap 47 also has a cam engaging finger 52 fixed thereto which is adapted to engage the surface of a cam 53 positioned beneath the strap 47. The cam 53 is of sufficient diameter to hold the contact 50 away from the bus bar contact 51, but has at certain points on its periphery, notches 54 which, when aligned with the finger 52, allow the strap 47 to spring down and engage the contact point 50 with the contact 51. Each of the cams 53 in the time switch bank 1 are fixed on a common shaft 55, and are so constructed that as the shaft 55 is rotated one revolution, they cause the switches 1–35 to set up combinations of open and closed switches which will display numbers from 1 to 12 in sequence on the lamp bank 1. The cams 53 in time switch bank 2 are fixed to a common shaft 56 and are constructed to set up combinations to display numbers from 0 to 5 in sequence during one revolution of the shaft 56. The cams 53 of time switch bank 3 are fixed to a common shaft 57 and are constructed so as to set up combinations to display numbers from 0 to 9 in sequence during one revolution of the shaft 57.

The cams 53 in temperature switch bank 1 are fixed to a shaft 58 and constructed to set up combinations to display numbers from 1 to 12 in sequence during one revolution of the shaft 58. In temperature switch bank 2, the cams 53 are fixed to a common shaft 59 and constructed to set up combinations to display numbers from 0 to 9 in sequence during one revolution of the shaft 59.

When it is desired to display the correct time on the panel 40, current may be supplied to the bus bars 42, 43 and 44 of the time switch banks 1, 2 and 3 to pass through the closed switches of those banks and light appropriate lamps on the panel 40. When it is desired to display temperature, current may be supplied to the bus bars 45 and 46 of temperature switch banks 1 and 2 so as to pass through the closed switches of those banks and light appropriate lamps on the panel 40.

Since the switches of time switch banks 1 and 2, and temperature switch banks 1 and 2, are connected in parallel, some means must be provided to open all the paralleled switches of the temperature banks during a time display, and all the paralleled time switches during a temperature display. Otherwise any closed switch of the mechanism not in control of the display panel 40 could pass current to its bus bar and cause an unintelligible display on the panel 40. For example, consider that the time *is* 12:00 and the temperature 77 degrees F. In this situation, lamps 3 of lamp bank 1 are used both in the time display and the temperature display since they must be lighted in displaying either a 12 or a 7. Therefore switches 3 of time switch bank 1 and temperature switch bank 1 are closed. These switches are also connected in parallel. If the bus bar 42 of time switch bank 1 is energized to light the lamps of bank 1 to show a 12, current could pass through switch 3 of temperature switch bank 1 and energize bus bar 45, thus causing lamps on lamp bank 1 to display a 7 superimposed on the number 12 displayed thereon. A similar result would occur on lamp bank 2 since lamps 3 in that bank are used both to display an 0 and a 7.

Figure 3:
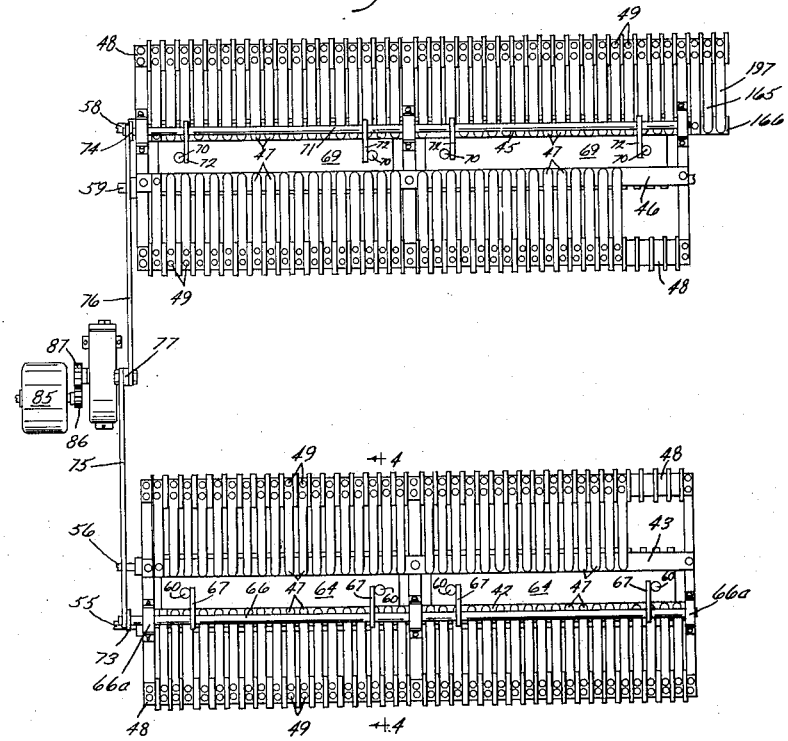
FIGURE 3 is a partial plan view of the control mechanism, illustrating the means for opening all the switches of each of the paralleled time and temperature switch banks alternately.

To prevent this, we provide mechanical lifting means in switch banks 1 and 2 of the time indicating mechanism and switch banks 1 and 2 of the temperature indicating mechanism. As best shown in FIGURES 3, 4 and 5, the switches of banks 1 and 2 of the time indicating mechanism are positioned in parallel rows, with the contact carrying ends of the straps 47 facing inwardly. The bus bars 42 and 43 are positioned a short distance apart and beneath the contact points 50. Cam shaft 55 extends beneath the switches of bank 1 and has cams 53 thereon in engagement with the fingers 52 of the several switches. Cam shaft 56 extends beneath the switches of bank 2 and has the cams 53 for this bank fixed thereto. Between the switch banks, several phenolic posts 60 are provided. The posts 60 have apertures 61 at their lower ends which receive pins 62. The pins 62 are secured to the mounting base for the various mechanisms and mount the posts 60 for vertical movement thereon. Each of the posts 60 has a shoulder 63 thereon intermediate its ends. Lifting combs 64 made of an insulating material are carried by the posts 60, the combs 64 having apertures therein receiving the upper portions of the posts and resting upon the shoulders 63. The combs 64 extend outwardly from the posts 60 beneath the bus bars 42 and 43 and above the cam shafts 55 and 56. The combs 64 are notched as shown at 65 at their outer edges so that the cams 53 on the shafts 55 and 56 may protrude therethrough. The outer edges of the lifter combs 64 are beneath the fingers 52. As shown in FIGURE 5, the fingers 52 are wider than the cams 53 and the notches 65 so that as the combs 64 are raised up, the fingers 52 will be engaged and lifted to open those switches which are closed against the bus bars 42 and 43. Those switches which are held open by the engagement of their fingers 52 with high points on the cams 53 need not be opened further, so the lifting distance of the combs 65 is less than the difference between the high and low points on the cams 53. In order to lift and lower the lifting combs 64, an actuating shaft 66 is provided. The shaft 66 is journalled in bearing blocks 66a which are secured to the frame that mounts the switches of banks 1 and 2, and has levers 67 fixed thereto which extend radially toward the posts 60. The posts 60 are pivoted to the levers 67 by pins 68. With this construction a small amount of rocking motion applied to the shaft 66 is sufficient to raise and lower the posts 60 and the combs 64 carried thereby whereby to lift all the closed switches of banks 1 and 2.

Switch banks 1 and 2 of the temperature indicating mechanism are arranged in the same manner as banks 1 and 2 of the time indicating mechanism as is shown in FIGURE 3, and are provided with lifting combs 69, posts 70, a rock shaft 71 and levers 72 in a like manner. A small amount of rocking movement of the shaft 71 will lift all of the closed switches of the temperature switch banks. It will be noted that the shafts 66 and 71 are so arranged with respect to the lifting combs they control, that rotation of both shafts 66 and 71 in the same direction causes the switches of one mechanism to close and the switches of the other mechanism to open.

The shafts 66 and 71 have at one end crank arms 73 and 74 which are connected to links 75 and 76. The links 75 and 76 are pivoted to a rocker arm 77 fixed to a shaft 78 journalled in a cam housing 79 (see FIGURES 6 and 7). With this construction movement of the rocker arm 77 toward the switches of the time indicating mechanism will cause the shafts 66 and 71 to be rotated in a direction to raise the combs 64 and open all the closed switches in banks 1 and 2 of the time indicating mechanism, and to lower the combs 69 and close the switches of the temperature indicating mechanism. Movement of the arm 77 in the opposite direction has the opposite effect.

Inside the cam housing 79, a cam shaft 80 is journalled. The shaft 80 carries a cam 81 shaped as shown in FIGURE 7 with one half thereof of greater diameter than the other half. A pair of cam followers 82 and 83 are provided for the cam 81, spaced 180 degrees apart so that when one rides on the high portion of the cam 81 the other rides on the low portion. The followers 82 and 83 are carried by a yoke 84 fixed to the shaft 78 and as the cam 81 rotates, the followers 82 and 83 rock the yoke 84 and the shaft 78 the required amount to lift and lower the combs 64 and 69. The cam shaft 80 is driven by a motor 85 through gears 86 and 87.

The motor 85, through gears 88 and 89, also drives a main breaker cam shaft 90 as shown in FIGURE 6. This shaft has fixed thereon four cams 91, 92, 93 and 94, which open and close four main breaker switches 95, 96, 97 and 98. The construction of the switches 95–98 is shown in FIGURE 8. Each of the switches 95–98 comprises a channel shaped bracket 99 pivoted to a shaft 100 which is supported by bracket means 101 to the mounting plate for the control mechanism. The bracket 99 mounts a switch strap 102 which carries a contact 103 at its free end. A second contact 104 is mounted beneath the contact 103. The bracket 99 also carries a cam follower 105 which rides on the face of the adjacent cam 91, 92, 93 or 94. A spring 106 urges the bracket 99 toward the cam 91, 92, 93 or 94 and urges the contacts 103 and 104 into engagement. Each of the cams 91–94 is of a diameter sufficient to maintain its switch 95–98 in open position, but has a reduced diameter portion 107 which, when aligned with the follower 105, allows the switch to close. The reduced portions 107 occupy approximately 170 degrees of the circumference of the cams 91–94, so that during each revolution of the shaft 90, each switch 95–98 is open for about 190 degrees and closed for about 170 degrees. The shaft 90 is driven at the same speed as the shaft 80.

As best shown in FIGURE 1, each of the switches 95–98 is connected by a lead 108 to an alternating current supply or line, one side of which is connected to a common ground. The contact point 104 of the switch 95 is connected by a lead 109 to the bus bars 45 and 46 of temperature switch banks 1 and 2. The contact point 104 of switch 96 is connected by lines 110, and 110a to the bus bars 42, 43 and 44 of time switch banks 1, 2 and 3. When switch 95 is closed, current will flow through line 109, bus bars 45 and 46, and thence through the closed switches of temperature banks 1 and 2 to light appropriate lamps on the display panel. Likewise if switch 96 is closed, current will flow through lines 110 and 110a, bus bars 42, 43 and 44, and thence through the closed switches of time switch banks 1, 2 and 3, to light appropriate lamps on the display panel. Since it is desired to alternate the time and temperature displays, the cams 92 and 93 of switches 95 and 96 are adjusted 180 degrees apart so that these switches open and close alternately. These cams 92 and 93 are also adjusted with respect to the lifting cam 81, which as previously described, operates at the same speed, so that the switch 95, which energizes temperature bus bars 45 and 46, is closed during the period that the lifter combs 69 are down and combs 64 are raised, and switch 96, which energizes time bus bars 42, 43, and 44 is closed when the combs 64 are down and combs 69 are raised. The operation is diagrammatically illustrated in FIGURE 10.

Figure 9:
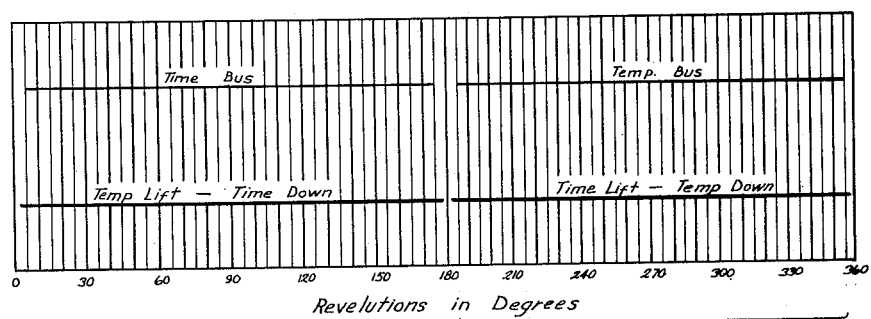
FIGURE 9 is a graph illustrating the sequence of operation of the lifting mechanism and the main breaker switches for the several switch banks.

It is well known that the life of a switch is considerably shortened each time the switch is opened under load, due to the deterioration of the contact points through arcing. By the shaping and timing of the cams 81, 92 and 93, we have eliminated all possibility of arcing in all of the switches of time banks 1, 2 and 3 and temperature banks 1 and 2. As hereinbefore described, the cam 81 is designed so that the rocker arm 77 is moved from one extreme to the other, every 180 degrees of revolution of the cam shaft 80. The transition from one position to the other is quite rapid, so that the rocker arm resides in each of its extreme positions for substantially the full 180 degrees, maintaining the switches of one mechanism or the other open by means of the lifting combs 64 or 69. The main breaker switches 95 and 96, however, do not remain closed for a full 180 degrees, as hereinbefore described, but only for about 170 degrees. There is therefore a period during the revolution of the cam shaft 90 when both switches 95 and 96 are opened. This period occurs every 180 degrees and lasts for 10 degrees of revolution. This period is timed with respect to the cam 81 so that it occurs at the time the cam 81 moves the rocker arm 77 from one position to another. This means that all the bus bars 42–46 are deenergized during the time the switches of one mechanism are opened and the others are closed by the lifting mechanism, so that no arcing occurs at any switch being opened or closed. The graph of FIGURE 9 illustrates this operation. The horizontal axis of the graph represents degrees of revolution of the shafts 80 and 90. The heavy lines marked "Time Lift" and "Temp Lift" represent the periods of revolution when the switches of the time and temperature banks are lifted. The light lines marked "Time Bus" and "Temp Bus" represent the periods of revolution during which the bus bars of the time switch banks and temperature switch banks are energized, that is, when the switches 95 and 96 are closed. It will be apparent from examination of this graph that 360 degrees revolution of the shafts 80 and 90 constitute a full cycle of time and temperature display.

The mechanism just described operates extremely efficiently to display time and temperature alternately on a common panel. The switches of each of the time and temperature mechanisms are set up in the correct combinations by the mechanisms described hereinafter, so that current flowing through them from the bus bar they engage will light the correct lamps. The lifters 64 and 69 lift the closed switches of each mechanism without upsetting the combination during the period that the other mechanism is in control of the lamps to prevent a double display.

The switches of each of the time and temperature indicating mechanisms are opened and closed to set up the proper combinations by means of the cams 53. The mechanisms by which these cams 53 are manipulated to always produce the presently correct information will now be described.

*Time Indicating Mechanism*

In the time indicating mechanism, the cams 53 or switch bank 1 are mounted on the common shaft 55 and constructed so that rotation of the shaft 55 through one complete revolution will set up twelve different switch combinations, to display each number from 1 to 12. Shaft 55 makes one revolution every twelve hours.

The switches of bank 2 are mounted on the common shaft 56 and constructed to set up six different switch combinations to display numbers from 0 to 5 in sequence. The shaft 56 must make one revolution each hour. The switches of bank 3 are mounted on the common shaft 57 and constructed to set up ten different switch combinations to display numbers from 0 to 9 in sequence. This shaft must make one revolution every ten minutes.

Figure 13:
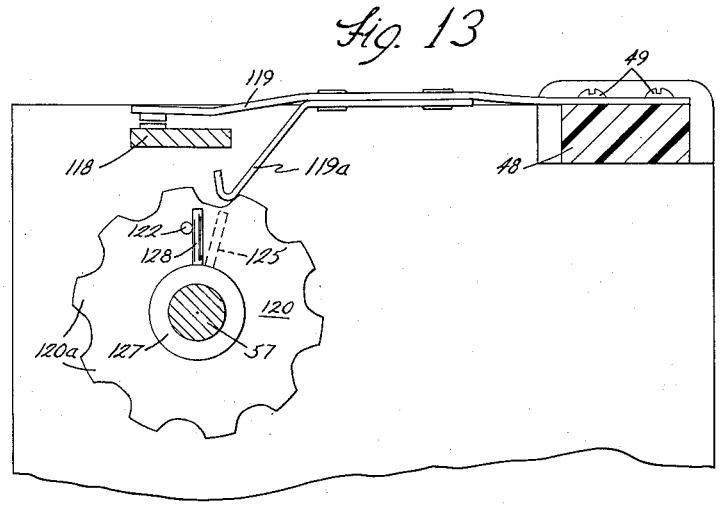
FIGURE 13 is an enlarged fragmentary sectional view taken on the line 13—13 of FIGURE 12.

Referring to FIGURES 11 and 12, the minute bank shaft 57 has a gear 111 thereon which, through gears 112, 113, 114 and 115 is driven by a motor 116. In order to provide an accurate display, the motor 116 must be energized once each minute to drive the shaft 57 one-tenth of a revolution, whereby to change the last number of the time display. To accomplish this, the power lead 117 of the motor 116 is connected to a bus bar 118 located at the extreme left hand of switch bank 3. The bus bar 118 is engaged by a switch 119, best shown in FIGURES 12 and 13, which is actuated by a cam 120. The switch 119 is connected to a lead 121 which in turn is connected to the contact 104 of main breaker switch 97. When switch 97 is closed, the switch 119 is, in effect, connected directly to the power source. The purpose of the breaker switch 97 will presently appear. Consider for the present that switch 119 is connected directly to the power source. If this is true, the motor 116 will be driven whenever switch 119 is closed.

The switch 119 is manipulated by the cam 120. This cam has ten lugs 120a thereon which, when driven past the actuating finger 119a of switch 119 will open the switch 119. The cam 120 is mounted on shaft 57 but not fixed thereto. It is free to float on the shaft 57 and driven by means of a cross pin 122 extending therethrough. A clock motor 123 is mounted adjacent the cam 120 and has a collar 124 fixed to its drive shaft which has a radial pin 125 thereon. The motor 123 is energized by a lead 126 connected to the power source and operates continuously, its speed being such that the collar 124 rotates one-tenth r.p.m. When the pin 125 of the collar 124 engages the cross pin 122, the cam 120 will be driven. A second collar 127 is fixed on the shaft 57 on the opposite side of the cam 120 from the collar 124. The collar 127 has a pin 128 thereon also capable of engaging the cross pin 122 and driving the cam 120. This construction (not new to or claimed as part of this invention) results in energization of the motor 116 once each minute to drive the shaft 57 one-tenth of a revolution. The operation is as follows: Assume that the cam 120 is positioned so that the actuating finger 119a of switch 119 is engaged with a lug 120a on cam 120 and therefore open, the motor 116 is deenergized, and the shaft 57 stopped. Assume also that the pin 125 on the clock motor collar 124 is engaged with the cross pin 122. Now as the collar 124 rotates, the cam 120 will be driven by the clock motor 123 until the actuating finger 119a of switch 119 drops off the lug 120a. Then motor 116 will be energized and will drive shaft 57 carrying the collar 127 and its pin 128 around to engage the cross pin 122 of cam 120 whereby to drive the cam 120. When the pin 128 drives the cam 120 far enough to engage the next lug 120a with the finger 119a, the switch 119 will open and stop motor 116. The cam 120 will then be held stationary until the pin 125 on the collar 124 catches up and drives the cam 120 to move the new lug 120a past the actuating finger 119a and start the motor 116 again. The time elapsing between each closing of the switch 119 is one minute. The distance that the shaft 57 is driven during each closing of the switch 119 is one-tenth of one revolution.

Figure 14:
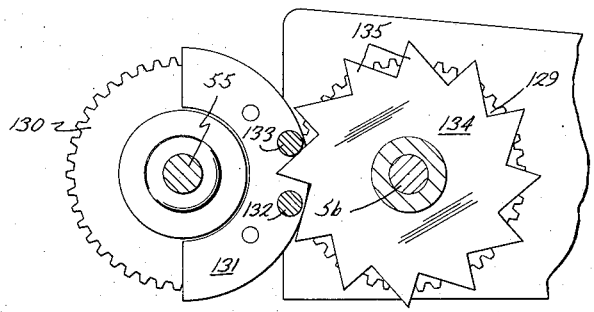
FIGURE 14 is a fragmentary sectional view taken on the line 14—14 of FIGURE 12.

In order to provide for proper rotation of the shafts 56 and 55 to change the ten minute, and hour shafts when necessary, means are provided to drive these shafts in response to rotation of the shaft 57. As shown in FIGURE 12, the shaft 57 has at its right end a gear 129. A similar gear 130 is rotatably mounted on the shaft 55 in position to mesh with and be driven by the gear 129, at the same speed as the shaft 57. The gear 130 has a plate 131 fixed to one face thereof. The plate 131 carries a pair of spaced apart pins 132 and 133, which extend outwardly parallel to the axis of the gear 130. On the ten minute cam shaft 56, a star wheel 134 having twelve teeth 135 is fixed. The star wheel 134 is so aligned as to be engaged by the pins 132 and 133, as shown in FIGURE 14. The construction is such that the engagement of one pin with one tooth rotates the wheel 134 one-twelfth of a turn. With the construction shown in FIGURES 12 and 14, each complete revolution of the shaft 57, and consequently the gear 130 will result in rotation of the star wheel 134 an amount equal to one-sixth of one revolution, this being true since the pins 132 and 133 engage two teeth 135 on the wheel 134. The pins 132 and 133 on the gear 130 are so oriented with respect to the cams 53 on the shaft 57 that the first pin 132 is just brought into engagement with the star wheel 134 at the time the cams 53 on shaft 57 are in position to set the switch of bank 3 to display a number 9. Then as shaft 57 is rotated another one-tenth of one revolution to set up combinations to display a 0, the first pin 132 drives the star wheel 134 and consequently the shaft 56 far enough to change the switch combinations on bank 2. The parts remain in this position for one more minute and then as shaft 57 rotates another one-tenth of one revolution, the second pin 133 engages the wheel 134 and moves it far enough so that further movement would change the switches on bank 2. It will be noted that at all times save when either pin 132 or 133 is engaged with the wheel 134, the shaft 56 is free, and may be turned manually wtihout affecting the remainder of the mechanism.

Figure 15:
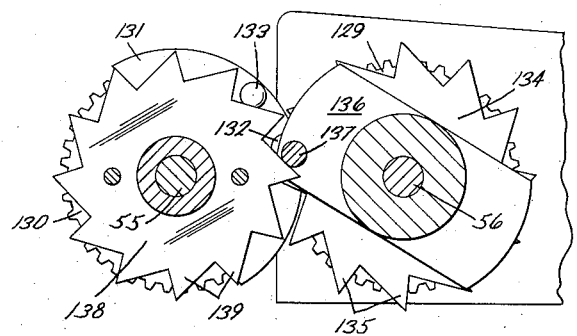
FIGURE 15 is a fragmentary sectional view taken on the line 15—15 of FIGURE 12.

Rotation of the ten minute shaft 56 results in rotation of the hour shaft 55 in substantially the same manner as just described. The shaft 56 has thereon a radially extending lever 136 which has near its outer end a pin 137, as shown in FIGURES 12 and 15. The pin 137 is adapted, upon rotation, to engage a star wheel 138 fixed to the shaft 55. The star wheel 138, like the wheel 134, has twelve teeth 139 thereon. The construction is such that engagement of the pin 137 with a tooth 139 on the wheel 138 will cause the shaft 55 to be rotated one twelfth of one revolution, and set up a new switch combination on switch bank 1. The lever 136 and pin 137 are so oriented with respect to the cams 53 on the ten minute shaft 56, that when these cams are positioned to set up switch combinations to display the number 5, the pin 137 is just brought into engagement with a tooth 139 on the wheel 138. Then as the shaft 55 is rotated to set up a combination of switches in bank 2 to display a 0, the pin 137 rotates the wheel 138 one twelfth of a revolution and disengages. It will be noted that at all times save when the pin 137 is in engagement with the wheel 138, the shaft 55 is free to be manually turned. As shown in FIGURE 12, each shaft 55, 56, and 57 is provided with an index collar 140 and a pointer 141 so that the position of each shaft may easily be determined.

As hereinbefore described, the switch 119 is connected through a lead 121 to the contact 104 of the main breaker switch 97. This is done to prevent the motor 116 from driving to change the switches on the time banks 1, 2 and 3 during a period of time display. If the motor 116 were allowed to drive during a period of time display, some of the switches of the time switch banks 1, 2 and 3 would be manipulated while carrying current, and destructive arcing would occur. It is a purpose of this invention to prevent such arcing. This is accomplished by setting the cam 93 of the breaker switch 97 180 degrees out of phase with the cam 92 of switch 96. Thus the switch 97 will be open during the time the switch 96 supplies power to bus bars 42, 43 and 44, and will keep the motor 116 from being energized. If the clock motor 123 allows switch 119 to close during a time display, nothing will happen until that display is completed and a temperature display is begun. Then breaker switch 97 will close and allow the motor 116 to set up a new time combination. Since the periods of time and temperature display are each less than one minute, and normally in the neighborhood of 5 or 10 seconds, cutting off the power source of motor 116 during time display cannot result in the time mechanism losing time.

The time indicating mechanism just described operates efficiently to maintain the switches of banks 1, 2 and 3 in proper condition to display correct time whenever control of the lamps 41 of the display panel 40 is transferred to it by the lifting mechanism and the main breaker switches. The novel driving connection between the shafts 55, 56 and 57 provides positive proportional rotation of these shafts to maintain proper switch combinations and also allows individual manual rotation of the shafts for rapid resetting. This latter function is of considerable importance to the operator since it allows him to reset the mechanism after a power failure of several hours without the necessity of driving the one minute shaft through many revolutions to bring the mechanism into correct position. Instead, he can move each shaft individually to its proper position by less than one revolution thereof. It has been found that the best method of resetting is to set the shafts individually to within a few minutes of the correct time, and then run the motor 116 to bring the whole mechanism up. To provide for running the motor 116 independently of the switch 119, a switch 142 is provided in the line 117 which may be manipulated to connect the motor 116 directly to the power source.

*Temperature Indicating Mechanism*

Figure 17:
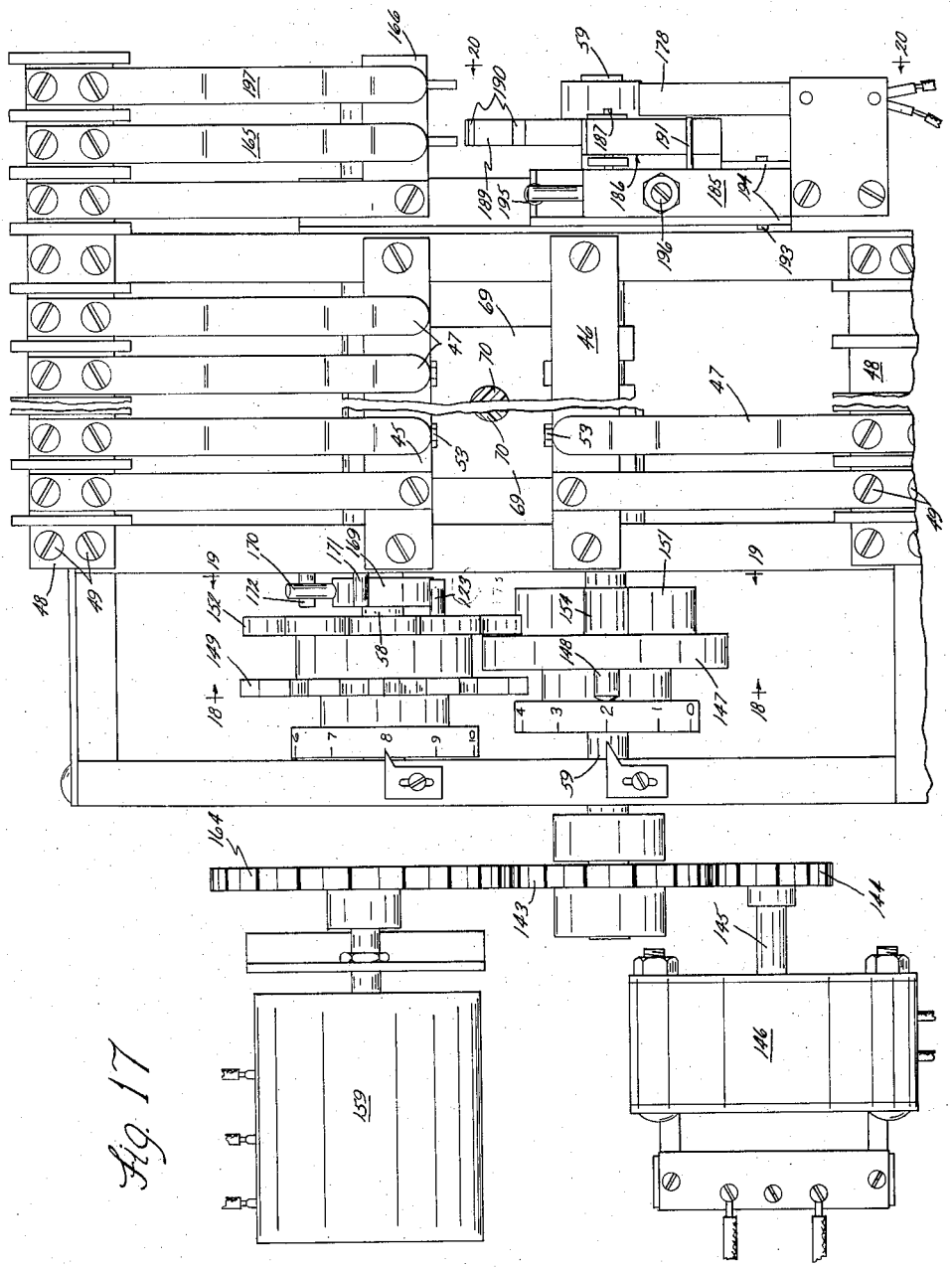
FIGURE 17 is a plan view of the motor and power transmission means which maintain the proper temperature switch combinations.
Figure 18:
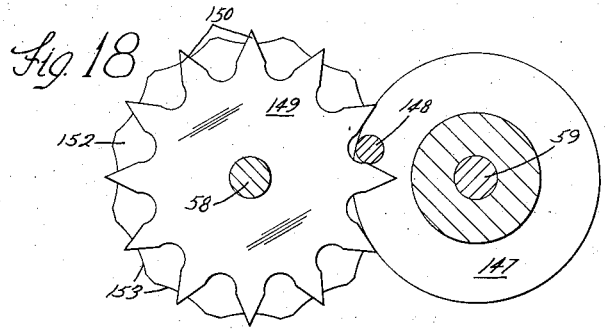
FIGURE 18 is a fragmentary sectional view taken substantially on the line 18—18 of FIGURE 17.

As hereinbefore described the switches of banks 1 and 2 of the temperature indicating mechanism are controlled by cams 53 fixed to cam shafts 58 and 59 respectively. The cams on shaft 58 of switch bank 1 must be capable of setting up twelve combinations to display numbers from 1 to 12 during one revolution. The cams on cam shaft 59 must be capable of setting up ten different switch combinations on bank 2 to display numbers from 0 to 9 during one revolution. As shown in FIGURE 17, the cam shaft 59 of switch bank 2 has at the extreme left end, a gear 143 thereon. This gear 143 meshes with and is driven by a gear 144 fixed to the drive shaft 145 of a motor 146. The motor 146 is capable of driving the shaft 59 in either direction. The shaft 59 also carries a disk 147 which has a pin 148 fixed on one face thereof. On the shaft 58 a star wheel 149 is fixed in position to be engaged by the pin 148. The star wheel 149 has twelve teeth 150 thereon, and is rotated one twelfth of one revolution each time the pin 148 moves past and engages with a tooth 150. As shown in FIGURE 18, the teeth 150 are symmetrical, so that the wheel 149 may be driven in either direction.

Figure 19:
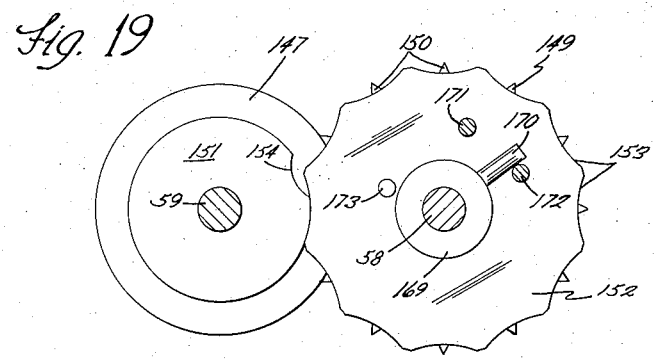
FIGURE 19 is a fragmentary sectional view taken substantially on the line 19—19 of FIGURE 17.

The shafts 58 and 59 are driven by the motor 146 according to temperature change. The mechanism for driving the motor is such that once calibrated it will always cause the motor 146 to drive the cam shafts 58 and 59 to maintain proper switch combinations to display present temperature. Once the mechanism is adjusted, there is never any need to reset the cam shafts 58 and 59 as in the case with the time indicating mechanism. This being true, it is desirable to lock the shafts 58 and 59 together so that they may not be rotated with respect to each other save by the pin 148 and wheel 149. This is accomplished by providing on the disk 147, an enlarged hub portion 151 and providing on the wheel 149 a locking disk 152. As shown in FIGURE 19, the locking disk 152 has its circumferential surface formed into twelve concave surfaces 153. These surfaces are formed so that they match the curvature of the hub 151. The diameter of the locking disk 152 is such that one of its surfaces lies immediately adjacent the hub 151 and prevents the disk 152 from being rotated. The hub 151 has a notch 154 therein which is aligned with the pins 148 so that when the pin 148 engages the wheel 149 to rotate it, the notch 154 moves into alignment with the locking disk 152 and, as shown in FIGURE 19, allows it to rotate one twelfth of one revolution.

As hereinbefore described, the motor 146 is driven according to temperature change. The temperature control mechanism which controls the motor 146 will now be described. This mechanism is best illustrated in FIGURE 16. The motor 146 is a shaded pole single phase alternating current motor having a main winding 146*a* connected to the power source, and having two directional shading windings 146*b* and 146*c* which receive current from the temperature control mechanism to determine the direction of rotation. As with any shaded pole motor, torque is not created unless both the main winding 146*a* and one of the shading windings 146*b* are energized. As shown in FIGURE 16, the main winding is connected through a switch 155 to a lead 156 which is connected to the contact 104 of the last main breaker switch 98. The cam 94 of the switch 98 is adjusted on the cam shaft 90 180 degrees out of phase with the cam 91 of the breaker switch 95 which supplies power to the bus bars 45 and 46 of the temperature switch banks 1 and 2, so that power to the motor 146 is cut off during temperature display periods to prevent a change in temperature from causing the switches of these banks to be manipulated while they are carrying current. This prevents arcing at the contacts of these switches and also prevents interruption of the display. By means of the switch 155 in the line 156, the main winding 146a of the motor 146 may be switched directly to the power source for testing purposes.

In order to cause the switches of banks 1 and 2 to set up proper combinations, the motor 146 must be caused to drive in one direction for temperature increase, in another direction for temperature decline. To accomplish this a temperature bulb 157, which comprises a resistance element, the resistance of which varies linearly with temperature, is provided. The bulb 157 is made one element of a measuring bridge 158. The bridge 158 includes as another element a potentiometer 159. The bridge 158 may be maintained in balance for any resistance value of the bulb 157 within reasonable limits, by manipulation of the potentiometer 159. When the resistance of the bulb changes, the bridge becomes unbalanced.

The unbalance is manifested in the form of a voltage. This voltage is communicated to the input of an amplifier 160 and there amplified sufficiently to operate the drive motor 146. The output of the amplifier 160 is connected by two lines 161 and 162 to the poles of a double pole switch 163a, of a reversing relay 163, the purpose of which will presently appear. The contacts of the double pole switch 163a are connected to the shading windings 146b and 146c of the motor 146 in such a manner that manipulation of the switch 163a reverses the connections to the shading windings 146b and 146c to the output leads 161 and 162. The amplifier 160 is so constructed, and so connected with the bridge 158 that an unbalance caused by temperature decline is amplified and transmitted to the shading windings of the motor 146 so as to cause rotation in one direction, while an unbalance caused by temperature increase is amplified and transmitted so as to cause rotation in the opposite direction.

As previously described, the motor 146 has a gear 144 fixed to its drive shaft 145, which meshes with a gear 143 on the shaft 59. As shown in FIGURES 16 and 17, the potentiometer 159 is mounted adjacent the gear 143 and has a gear 164 which meshes with the gear 143, so as to be driven when the motor 146 operates. With this construction, operation of the motor 146 due to an unbalance in the bridge 158, mechanically changes the resistance of the bridge 158 through the potentiometer 159. The potentiometer 159 is so connected that the motor 146 always drives it in a direction to balance the bridge 158 and cancel the unbalance signal. Any unbalance caused by temperature change, then, results in driving of the motor 146 until the bridge 158 is balanced. By proper adjustment and calibration, this driving is made to manipulate temperature switch banks 1 and 2 so as to display correct temperature.

As previously mentioned, the cam shaft 58 is adapted to move one twelfth of one revolution for each full revolution of shaft 59, and has twelve equally spaced stations thereon. Since at temperatures between 0 degrees and 10 degrees temperature it is not desirable to display anything on lamp bank 1, one of the twelve stations on cam shaft 58 is left blank and all the cams are constructed so as to open their switches at this point. This blank station is adjacent the station where the cams set up the number 1 on one side, and adjacent the station where they set up a number 11 on the other side. With this construction, temperatures of 120 degrees and above, cannot be recorded since there is no cam shaft position for setting up a "12" on bank 1. The potentiometer 159 is also constructed so that for a temperature of 119 degrees, its pick-off slide is adjusted nearly to one end of the scale. This being true, it is desirable to provide limit means to prevent the motor 146 from further rotation in the temperature increase direction if and when the temperature rises above 119 degrees. This is accomplished by means of a limit switch 165. The switch 165 is mounted near the right hand end of (FIG. 16) switch bank 1 and closes against a bus bar 166. The switch 165 is connected by a line 167 to the power source. When it is closed, it energizes the bus bar 166. This bus bar 166, through a lead 168 supplies plate voltage and filament voltage for the amplifier 160. The limit switch 165 is operated by a cam (not shown) on the shaft 58, which cam has a single lug thereon positioned midway of the "11" station and the blank station on cam shaft 58. Thus when the temperature passes 119 degrees and the cam shaft is rotated from the "11" station toward the blank station, the limit switch 165 is opened and the amplifier 160 is turned off, preventing further driving of motor 146. In addition to this electrical limit, a mechanical limit is also provided as shown in FIGURES 17 and 19 and comprises a collar 169 rotatably mounted on shaft 58. The collar 169 has a radial pin 170 thereon. A pair of spaced apart pins 171 and 172 are provided on the framework that mounts shaft 58, as shown in FIGURE 17, on each side of the pin 170, so that the collar 169 is permitted to rotate a limited amount. An additional pin 173 is mounted on the locking disk 152. The pin 173 on the disk 152 is positioned so as to engage the radial pin 170 and force it against the stop pin 172 when the shaft is moving from the "11" station toward the blank station and has nearly reached the blank station. This mechanical limit is operative only in the event that the electrical limit switch 165 fails to stop the movement midway of the "11" station and the blank station. The purpose of the stop pin 171 is to provide a mechanical limit operable below zero degrees and operates in substantially the same manner.

It is imperative for proper operation of the temperature indicating mechanism, that the motor 146 drive the one degree cam shaft 59 a full one tenth revolution each time it is operated. If the shaft 59 is driven less than this amount, the cams 53 thereon will not set up the proper combination of switches. As hereinbefore described, however, the motor 146 drives the potentiometer 159 toward balance while it drives the cam shaft 59. Thus the moment the motor 146 is energized by an unbalance signal, it starts to cancel that signal out. It can be seen that if the signal was just enough to energize the motor 146, the first fractional amount of rotation would decrease the signal, and stop the motor 146 before it could drive the shaft 59 one full tenth of a revolution. To prevent this, we provide means to temporarily increase the unbalance signal when the motor 146 is energized to insure a full one tenth revolution of the shaft 146. As shown in FIGURE 16, the potentiometer 159 comprises a resistance unit 159a against which a pick-off slide 159b operates. For convenience, the end terminals of the resistance unit will be referred to as B and C and the pick-off point will be referred to as A. The terminals B and C are connected to the bridge 158 by leads 174 and 175. A double pole switch 176a of a reversing relay 176 is included in the lines 174 and 175 in such a way that they may be reversed in their connection to the bridge 158 by operation of the relay 176. The purpose of this relay will appear later herein.

Figures 20, 21:
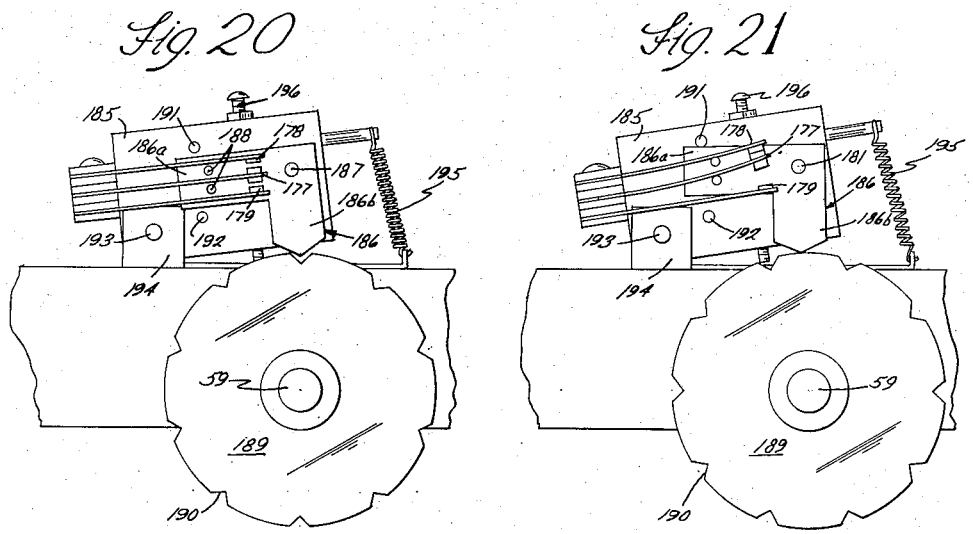
FIGURE 20 is a fragmentary sectional view taken substantially on the line 20—20 of FIGURE 17, showing our improved sensing switch which insures that the driving motor for the temperature switch cam shafts will drive the cams the proper distance.
FIGURE 21 is a view similar to FIGURE 20, but illustrating the sensing switch in a different position.

The mechanical connection of the potentiometer 159 is such that when the motor 146 drives in a direction to cause the shafts 58 and 59 to "count forward," that is, to set up numbers in positive sequence, as for increasing temperature, the point A is moved toward terminal B, thus adding resistance to portion A—C of the potentiometer, and taking it from portion A—B. When the motor 146 rotates to cause shafts 58 and 59 to "count backward,"

that is, to set up numbers in negative sequence, point A is moved toward point C. In order to artificially increase the unbalance signal to the motor 146, to insure that it will drive shaft 59 a full one tenth revolution, all that needs to be done is to short out that part of the potentiometer to which resistance is being added. The unbalance signal indicates a deficiency of resistance in one part of the bridge and the potentiometer is driven to add resistance to this side. If the potentiometer is shorted, as above stated, a large deficiency in the already deficient side will occur, boosting the signal to such a value that the motor 146 will be cause to drive as far as desired in the proper direction. Now if, when the motor 146 has driven the shaft 146 a full one tenth revolution, the short is broken, the artificial signal will be cancelled, and the motor 146 will stop unless sufficient true unbalance still exists to cause further motion. If the temperature change has been only one degree, the motor will have driven the potentiometer 159 far enough to correct it, and there will be no unbalance remaining. The means by which this artificial unbalance is created, is shown in FIGURES 16, 17, 20 and 21. This means comprises a single pole, double throw starting switch 177 which is adapted to close against either of two contacts 178 and 179. As best shown in FIGURE 16, the shorting switch 177 is connected by a lead 180 to the pick-off slide 159b of the potentiometer 159. That is, switch 177 is electrically connected to point A. Contact 178 is connected by a lead 181 to terminal C of resistance unit 159a of potentiometer 159. Contact 179 is connected by a line 182 to a switch 183a of a relay 183, the purpose of which will appear later herein. The switch 183a is normally closed to a line 184 which leads to point B of potentiometer 159. Ignoring the relay 183 for the present, consider that contact 179 is electrically connected to point B. Switch 177 and contacts 178 and 179 are carried by a block 185 mounted on the supporting frame for the shaft 59, as shown in FIGURES 20 and 21. The block 185 has an L-shaped lever 186 pivoted thereto by a pin 187. The lever 186 has a substantially horizontal arm portion 186a which extends outwardly from the pin 187 beside the switch 177. The arm 186a has a pair of pins 188 thereon which pass above and below the switch 177 and hold it therebetween. It can be seen that if the lever 186 is pivoted on the pin 187 in a direction to raise the arm portion 186a, the switch 177 will be closed against contact 178. If the lever 186 is pivoted in the opposite direction, the switch 177 will be closed against contact 179. The lever 186 has a substantially vertical portion 186b which extends downwardly and terminates in a point. Below the portion 186b a cam 189 is positioned. The cam wheel 189 is fixed on the shaft 59, and has ten notches 190 equally spaced on its circumferential surface. The depending portion 186b of the lever 186 is adapted to engage in these notches 190, and to be pivoted to close the switch 177 against one or the other of the contacts 178 and 179. As shown in FIGURES 20 and 21 stop pins 191 and 192 are provided on the block 185 to limit the movement of the lever 186 in either direction.

The block 185 is mounted to the cam shaft mounting frame for vertical pivotal adjustment by a pivot pin 193 and ears 194. A spring 195 urges the block 185 toward the frame, and an adjustable stop screw 196 is provided to limit its downward movement. The stop screw 196 is normally adjusted so that the pointed end of the lever 186 resides slightly within one of the notches 190 in the wheel 189. With this construction, rotation of the cam wheel 189 in either direction will bring one edge of the notch 190 against the lever 186 to pivot it against one of its stops 191 and 192 whereby to close the switch 177 against one of the contacts 178 and 179. Further movement of the cam wheel 189 will cause the pointed end of the lever to climb out of the notches 190 by pivoting the block 185 on the pin 193 against the spring 195. When the cam wheel 189 has rotated one tenth of one revolution, the lever 186 will drop into another notch 190 and the switch 177 will be opened. It will be seen that rotation of the cam wheel 189 in a clockwise direction as reviewed in FIGURES 20 and 21, that is, the direction for "counting forward" the switch 177 will be closed against contact 178. This will effect a short between points A and C of the potentiometer 159 and, as described in the preceding paragraph, cause an artificial increase in the unbalance signal to the motor making it "count forward." On the other hand, if the cam wheel 189 is rotated in a clockwise or "count backward" direction, the switch 177 will be closed against contact 179 to short points A and B to increase the unbalance signal driving the motor 146 to "count backward." Thus the mechanism including elements 177–179 and 185–196, which may be generally referred to as the shorting mechanism, will, upon rotation of the motor 146 a fraction of a revolution, create a large artificial signal to drive the motor 146 a full one-tenth revolution in the correct direction. After the one-tenth revolution is completed, the artificial signal will be cancelled.

Since the motor 146 must drive one-tenth revolution wherever sufficient unbalance signal is generated by the bridge 158 and amplifier 160, it has been found necessary to decrease the sensitivity of the bridge and amplifier to prevent hunting. The bridge and amplifier must be constructed so that unbalance in the bridge 158, corresponding to one-half of one degree in temperature will not be sufficient to energize the motor 146. The bridge 158 may be constructed, however, so that unbalance corresponding to six-tenths of one degree and over, will drive the motor 146. With such a sensitivity range the mechanism will not hunt. For example, assume that the temperature is 70 degrees F. and the switches of banks 1 and 2 are set to display the number 70. If the temperature fluctuates from 70.5 degrees to 69.5 degrees no change will occur in the switch banks since no unbalance greater than one-half of one degree is present. Should the temperature drop to 69.4 degrees, then the unbalance corresponding to 0.6 degree will start motor 146 and it will drive to "count backward" to 69. When the "69" position is reached the shorting mechanism will open and cancel the artificial unbalance. The true unbalance remaining will be 0.4 degree. Since this is within the allowable range of unbalance no further driving will occur.

If, however, the sensitivity were such that 0.4 degree unbalance could cause driving, then a true temperature of 69.5 degrees would cause the mechanism to first drive to the "70" position, and then back to "69" and then forward to "70" and so on. No quiescent point could be reached.

The mechanism thus far described will operate to correctly display temperatures of 0 degree and above. However, when the temperature drops below 0 degree, another problem arises. As hereinbefore stated, the normal connections of the bridge 158, potentiometer 159 and motor 146 are such that temperature decline causes the motor 146 to "count backward." If the motor 146 were allowed to do this when the temperature decreased from 0 degree to −1 degree, the switches of banks 1 and 2 would set up the number 119. In order to display the number 1, it is necessary to reverse the operation of the motor 146 when the temperature drops below 0 degree. It is for this purpose that the reversing relay 163 and switch 163a is included between the amplifier 160 and motor 146 and the reversing relay 176 with its switch 176a is included between the potentiometer 159 and the bridge 158.

As previously described, unbalance in the bridge 158 caused by temperature decline causes the motor 146 to "count backward." By reversing the connections of the windings 146b and 146c to the lines 161 and 162, unbalance caused by decline can be made to make the motor 146 "count forward." As shown in FIGURE 16, moving the switch 163a from its position as shown to the opposite position will accomplish this result. The reversal must take place only after the motor 146 has caused the switches of banks 1 and 2 to set up a 0 and sufficient temperature decline unbalance signal is present to cause the motor 146 to begin driving shaft 59, and through pin 148 and star wheel 149, shaft 58 in the reverse or "count backward" direction. To cause the relay 163 to operate at this time, we provide a switch 197, called a zero switch, manipulated by a cam (not shown) on the shaft 58. The switch 197 contacts and receives current from the bus bar 166 which in turn is energized by the limit switch 165. The cam which operates zero switch 197 is constructed so as to hold switch 197 open during most of the rotation of the shaft 58 but has a notch therein which will allow the switch 197 to close just as the shaft 59 begins to move from the blank station to the 11 station. As will be remembered, the limit switch 165 opens midway of these stations, so the zero switch should close before the shaft 58 has moved far enough to trip the limit switch 165. The zero switch 197 is connected by a lead 198 to the relay 163 and energizes that relay when closed. The relay 163 is of the ratchet or impulse type wherein a single and non-continuous impulse is sufficient to change the switch 163a and maintain it in that position until a new impulse occurs. This construction is necessary since as will presently appear, the closing of zero switch 197 sets in motion a chain of events which results in shafts 58 and 59 being stopped and driven back in the "count forward" direction again, thus opening switch 197.

Energization of relay 163 reverses the connection of motor 146, causing it to begin "counting forward" for temperature decline. However, as hereinbefore described, the "count forward" direction of rotation drives the potentiometer in a direction to balance for temperature increase. It is therefore also necessary to reverse the connections of potentiometer 159 to the bridge 158 so that the "count forward" direction of rotation will cause the potentiometer 159 to correct for temperature decline. This is accomplished by energizing relay 176 and reversing switch 176a. Relay 176 is connected to a switch 163b which is operated by ratchet relay 163. Impulsing relay 163 at the zero point closes switch 163b against a contact connected by a line 199 to the bus bar 166, so that current flows to relay 176 and causes switch 176a to reverse the potentiometer leads 174 and 175.

Another switch 163c operated by ratchet relay 163 is provided to light lamps 34, 35 and 36 of lamp bank 1 to display a minus sign during the temperature display. The switch 163c closes against a contact to which a line 200 is connected. The line 200 connects to each of the lamps 34, 35 and 36 of lamp bank 1. The switch 163c is connected by a lead 201 to the main breaker switch 97 which, as previously described, is closed during the temperature display period. Current flows from main breaker switch 97 through line 201, switch 163c and line 200 to lamps 34, 35 and 36.

Relays 163 and 176 would be sufficient to reverse the operation of the temperature control mechanism and cause motor 146 to "count forward" for a temperature drop from 0 degree to −1 degree were it not for the shorting mechanism including elements 177–179 and 185–196. However, the inclusion of this mechanism creates a new problem when the reversal occurs. When the motor 146 is first driven in the "count backward" direction in order to close zero switch 197 and operate relays 163 and 176, the shorting mechanism establishes a short between points A and B of the potentiometer to increase the unbalance signal driving the motor 146 in "count backward" direction. When relays 163 and 176 operate to reverse the motor and potentiometer connections, this short is not broken. It cannot be broken except by reversing the direction of rotation of the motor 146. Therefore when the potentiometer 159 is reversed, the short A—B no longer produces an artificial unbalance signal simulating temperature decline, but instead, since the potentiometer 159 is reversed, short A—B creates an artificial signal simulating temperature increase. Since the connections of motor 146 have been reversed, a temperature increase unbalance signal no longer drives the motor to "count forward" but instead, drives the motor to "count backward." If the motor were allowed to "count backward" it would drive the shaft 58 from the blank station toward the "11" station and open the limit switch 165, stopping all operation.

This undesired effect is remedied by the relay 183 and switch 183a in the line 182 of the shorting mechanism. The switch 182, as previously described normally connects line 182 to line 184, thus electrically connecting contact 179 to point B. However, when relay 183 is energized, the switch 183a is moved to its opposite position, connecting line 182 to a lead 202 which is electrically connected to point C. Thus, when the relay 183 is energized, both contacts 178 and 179 of the shorting mechanism are electrically connected to point C. As shown in FIGURE 16, the relay 183 is connected by a line 203 to the zero switch 197. With this relay in the circuit the operation is as follows: Assume that the switches of banks 1 and 2 are set up to display a 0 and that the relays 163, 176 and 183 have not yet been energized, that is to say, the mechanism is connected for proper display of positive temperatures. Assume also that the temperature has dropped to −1 degree F. The temperature decline unbalance created in bridge 158 will cause motor 146 to drive to "count backward." This will cause switch 177 to close against contact 179 and establish a short between points A and B. When the "count backward" rotation has progressed far enough to close zero switch 197, relays 163, 176 and 183 will be energized, operating their switches as hereinbefore described. Relay 163 will reverse motor 146 so that temperature decline unbalance will cause it to "count forward." Relay 176 will reverse potentiometer 159 so that short A—B will simulate temperature increase and short A—C will simulate temperature decrease. At the same time relay 183 will break the connection between contact 179 and point B and will electrically connect contact 179 to point C. Therefore, switch 177 being in contact with contact 179, a short A—C will result. Now short A—C under the reversed conditions simulates temperature decline. Temperature decline, under the reversed conditions, causes motor 146 to count forward as desired. As soon as motor 146 begins to count forward, the shorting mechanism moves switch 177 into contact with contact 178. Contact 178 is directly connected to point C by lead 181 so the artificial unbalance simulating temperature decline is maintained and motor 146 can drive to "count forward" to set up the number 1 on switch bank 2. Cam shaft 58 is driven back to the blank station and zero switch 197 is opened. This deenergizes relay 183 and allows switch 183a to move back to normal position. From this point the mechanism operates just as in the unreversed connection excepting that the motor 146 "counts forward" for temperature decline and "counts backward" for temperature increase.

When the temperature rises above zero, the process just described is repeated to bring the mechanism back to normal operation.

It should be apparent from the foregoing that our improved temperature control mechanism, including the sensing or shorting means, provides a particularly simple and useful device for display signs of the character described herein.

It is believed that the foregoing description, read in connection with the accompanying drawings, clearly discloses the nature and advantages of our invention.

Having thus described our invention, we claim:

In a display sign comprising a display panel having a plurality of lamps mounted thereon, said lamps being connected in a plurality of separate lamp circuits, a time indicating mechanism including a first group of switches individually connected to said lamp circuits and selector means operatively connected to said first group of switches adapted to selectively close the individual switches of said first group to thereby indicate time, a temperature indicating mechanism including a second group of switches individually connected to said lamp circuits and selector means operatively connected to said second group of switches adapted to selectively close individual switches of said second group to thereby indicate temperature, and a power source; the improvement comprising means for alternately connecting said first and second groups of switches to said power source comprising a first power switch connected to said power source and to said first group of switches, a second power switch connected to said power source and to said second group of switches, a cam shaft, drive means operatively connected to said cam shaft, a first cam fixed to said cam shaft and operatively connected to said first power switch, a second cam fixed to said cam shaft and operatively connected to said second power switch, said first and second cams being identical to one another and angularly displaced from one another by 180 degrees, the portion of said cams adapted to open their respective power switches being greater than the remaining portion of said cams adapted to close their respective switches, a first mechanical apparatus operatively connected to said first group of switches adapted, when activated, to maintain said first group of switches in an inoperative position, a second mechanical apparatus operatively connected to said second group of switches adapted, when activated, to maintain said second group of switches in an inoperative position, cam means operatively connected to said drive means adapted to be driven in synchronism with said cam shaft, said cam means being operatively connected to said first and second mechanical apparatus, said cam means having a shape formed so as to activate said first mechanical apparatus shortly after said first cam has opened said first power switch and to maintain said first mechanical apparatus in this activated state until shortly before said first cam closes said first power switch, and so as to activate said second mechanical apparatus shortly after said second cam has opened said second power switch and to maintain said second mechanical apparatus in this activated state until shortly before said second cam closes said second power switch, there being a period between the opening of one of said power switches and the closing of the remaining power switch in their alternate order of operation during which said cam means activates and deactivates said first and second mechanical apparatus.

References Cited in the file of this patent

UNITED STATES PATENTS

| | | |
|---|---|---|
| 1,220,109 | Heiny | Mar. 20, 1917 |
| 2,078,781 | Sprenger et al. | Apr. 27, 1937 |
| 2,169,567 | May | Aug. 15, 1939 |
| 2,249,237 | Fulton | July 15, 1941 |
| 2,281,998 | Rast | May 5, 1942 |
| 2,282,998 | Lake | May 5, 1942 |
| 2,331,191 | Hodgkins | Oct. 5, 1943 |
| 2,597,950 | Robertson | May 27, 1952 |
| 2,673,976 | Williams et al. | Mar. 30, 1954 |
| 2,844,775 | Miller | July 22, 1958 |
| 2,870,393 | Whitehead | Jan. 20, 1959 |